United States Patent
True et al.

(10) Patent No.: US 7,327,986 B2
(45) Date of Patent: Feb. 5, 2008

(54) SYSTEM AND METHOD FOR VEHICLE DELAY NOTIFICATION USING A MOBILE TELECOMMUNICATIONS NETWORK

(75) Inventors: Sandra Lynn True, St. Charles, IL (US); David S. Benco, Winfield, IL (US); Sanjeev Mahajan, Naperville, IL (US); Baoling S. Sheen, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 116 days.

(21) Appl. No.: 11/095,478

(22) Filed: Mar. 31, 2005

(65) Prior Publication Data

US 2006/0223552 A1 Oct. 5, 2006

(51) Int. Cl.
*H04B 17/00* (2006.01)

(52) U.S. Cl. .............................. 455/67.11; 455/404.2; 455/456.1; 455/456.3; 340/426.19

(58) Field of Classification Search ............... 455/466, 455/456.3, 404.2, 418, 456.1, 67.11, 9; 340/426.19, 340/539.13
See application file for complete search history.

(56) References Cited

U.S. PATENT DOCUMENTS

| | | | | |
|---|---|---|---|---|
| 5,797,330 A | * | 8/1998 | Li | 104/28 |
| 6,216,085 B1 | * | 4/2001 | Emmerink et al. | 701/117 |
| 6,650,948 B1 | * | 11/2003 | Atkinson et al. | 700/66 |
| 7,089,107 B2 | * | 8/2006 | Jones | 701/201 |
| 7,194,347 B2 | * | 3/2007 | Harumoto et al. | 701/45 |
| 2004/0039527 A1 | * | 2/2004 | McDonald et al. | 701/213 |
| 2004/0198386 A1 | * | 10/2004 | Dupray | 455/456.1 |
| 2004/0243664 A1 | * | 12/2004 | Horstemeyer | 709/200 |
| 2005/0080588 A1 | * | 4/2005 | Kasai | 701/209 |

\* cited by examiner

*Primary Examiner*—CongVan Tran

(57) ABSTRACT

A system and method of vehicle delay notification. The method includes determining a vehicle delay, determining that the vehicle delay meets or exceeds a delay threshold, determining one or more affected mobile telecommunications subscribers, and sending a message to one or more mobile telecommunications phones notifying the one or more affected mobile telecommunications subscribers that the vehicle is delayed. The system determines the vehicle delay and sends a message to one or more mobile telecommunications phones notifying one or more affected subscribers that the vehicle is delayed.

26 Claims, 3 Drawing Sheets

SYSTEM AND METHOD FOR VEHICLE DELAY NOTIFICATION USING A MOBILE TELECOMMUNICATIONS NETWORK

BACKGROUND OF THE INVENTION

This invention relates to vehicle location monitoring and more particularly to notifying a person that the vehicle will be delayed from its expected time of arrival.

More and more people are carrying mobile telecommunications devices, also referred to as mobile phones or cellular phones. Mobile phones enable a person to communicate while moving about, greatly improving a person's ability to gather information. These devices can even receive messages, such as Short Message Service messages, without establishing a dedicated, duplex call session, further enhancing their ability to effectively provide information to people on the move.

Large numbers of people also depend on various forms of public transportation for travel. Typically, the public transportation vehicle reaches a destination at an expected time of arrival. Many vehicles, such as buses and trains, have several destinations, or stops, at which people enter or leave the vehicle. These vehicles usually follow schedules giving specific departure and/or arrival times for the stops the vehicle makes. Scheduled departure/arrival times greatly increase the convenience of using these vehicles for transportation.

However, for a variety of reasons, these vehicles may be delayed from their scheduled arrival. For example, a child's school bus may get caught in an extended traffic jam, or a train might have mechanical problems. People not aboard the vehicle, may not be aware of the delay which can be problematic if they are depending on the schedule. It is therefore desirable to provide a convenient way of notifying a person, regardless of their location, that a scheduled vehicle is running late.

The present invention contemplates a new and improved system and method that resolves the above-referenced difficulties and others.

SUMMARY OF THE INVENTION

A system and method of vehicle delay notification are provided.

In one aspect of the invention the method includes determining a vehicle delay, determining that the vehicle delay meets or exceeds a delay threshold, determining one or more affected mobile telecommunications subscribers, and sending a message to one or more mobile telecommunications handsets notifying the one or more affected mobile telecommunications subscribers that the is vehicle delayed.

In another aspect of the invention, the system determines the vehicle location, determines the vehicle delay and sends a message to one or more mobile telecommunications handsets notifying one or more affected subscribers that the vehicle is delayed.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

DETAILED DESCRIPTION OF THE PREFERRED EMBODIMENTS

Figure 1:
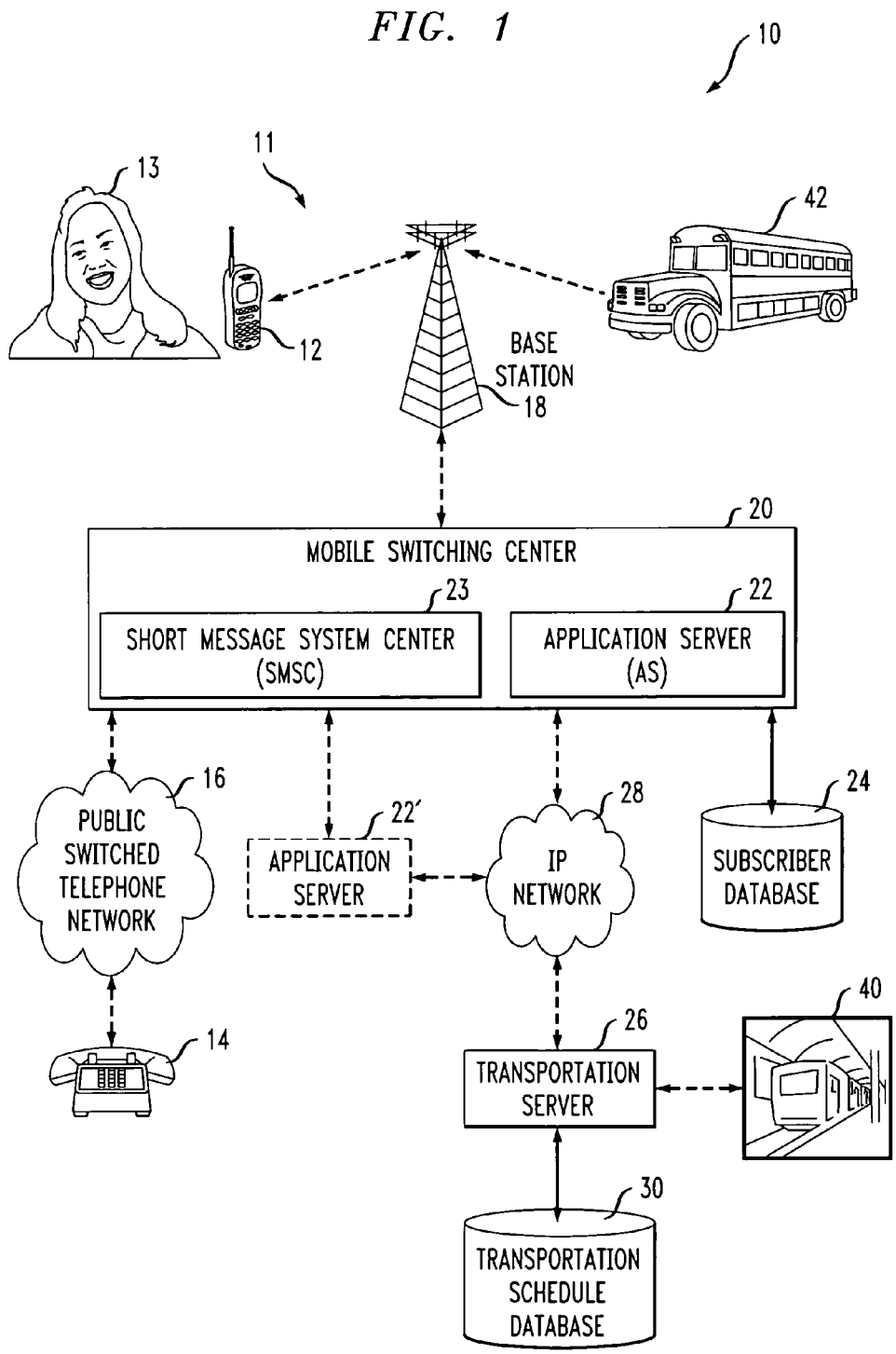
FIG. 1 is a block diagram illustrating a communications network including a system for practicing aspects of the present inventive subject matter.

Referring now to the drawings wherein the showings are for purposes of illustrating the preferred embodiments of the invention only and not for purposes of limiting same, FIG. 1 provides a view of the overall preferred system according to the present invention.

As shown in FIG. 1, a system for notifying mobile telecommunications subscriber of a vehicle delay is shown generally at 10. The system 10 can include elements of a telecommunications network as described below. Portions of a telecommunications network are shown generally at 11 for enabling a mobile telecommunications subscriber 13 to communicate with others using a mobile phone 12, also known as a mobile handset or cellular phone. The mobile phone 12 can communicate with other phones including, but not limited to, other mobile phones, landline phones 14 also known as Plain Old Telephone Service telephones, VOIP phones, or other phones capable of communicating over the Public Switched Telephone Network (PSTN) shown generally at 16 or the Internet shown at 28.

The telecommunications network 11 includes one or more base stations 18 for providing over-the-air communications to the mobile phone 12 in a known manner. The telecommunications network 11 also includes one or more telecommunications network switching elements, such as for example Mobile Switching Centers (MSC) 20, connected to the base stations 18. The MSC 20 handles call routing to and from the mobile phone 12. The MSC 20 is connected to the PSTN 16 for enabling the mobile phone 12 to communicate with other phones via the PSTN. The MSC 20 handles call set-ups for associated mobile phones 12, as well as providing services for these phones, including voice mail and others.

The MSC 20 can include an Application Server 22 for running application software suitable for performing the functions indicated below for notifying mobile subscribers 13 of a vehicle delay. Alternatively, the Application Server, shown in dashed lines at 22', can be located apart from the MSC 20 and connected thereto by a network connection. The telecommunicates network 11 can include a Short Message System Center (SMSC) 23 for sending Short Message System (SMS) messages to the mobile phones 12 as described below. The SMSC 23 can be located at the MSC 20, as shown, or elsewhere in the telecommunications network 11 and connected to the MSC in a known manner.

The telecommunications network 11 also includes a subscriber database 24 having mobile telecommunications subscriber 13 information for phones 12 associated with the MSC 20. The Subscriber Database 24 can be stored at the MSC 20 or connected to it and the Application Server 22, 22' via a known network connection for quick and reliable communication therebetween. The Subscriber Database 24 can be used for determining the subscribers who are affected by the vehicle delay and wish to be notified as described below.

A transportation server 26 can be connected to the Application Server 22 via a network connection, such as for example via an Internet Protocol (IP) network connection 28. The transportation server 26 can be operated by the transportation provider, such as the company or entity responsible for the operation of the vehicle(s) 40, 42 described below. The transportation server 26 can include a transportation schedule database 30 for storing schedules for vehicles including scheduled stops and the scheduled arrival and/or departure times for vehicle at those stops. The transportation schedule database 30 can also store locations between those stops and the expected times the vehicle is expected to be at those locations which can be used in determining the vehicle delay as described below.

Figure 2:
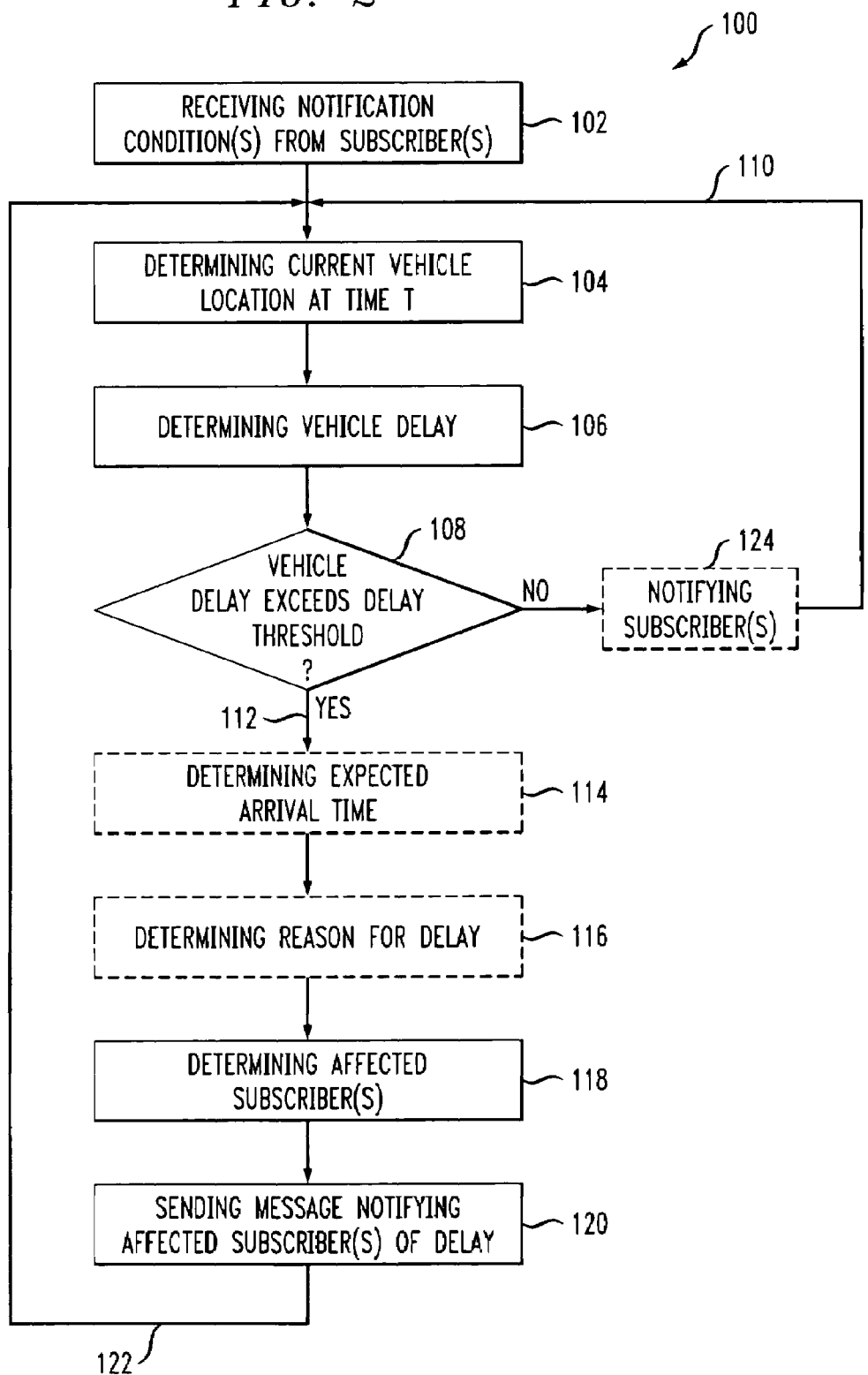
FIG. 2 is a flow chart illustrating a method in accordance with the present invention.
Figure 3:
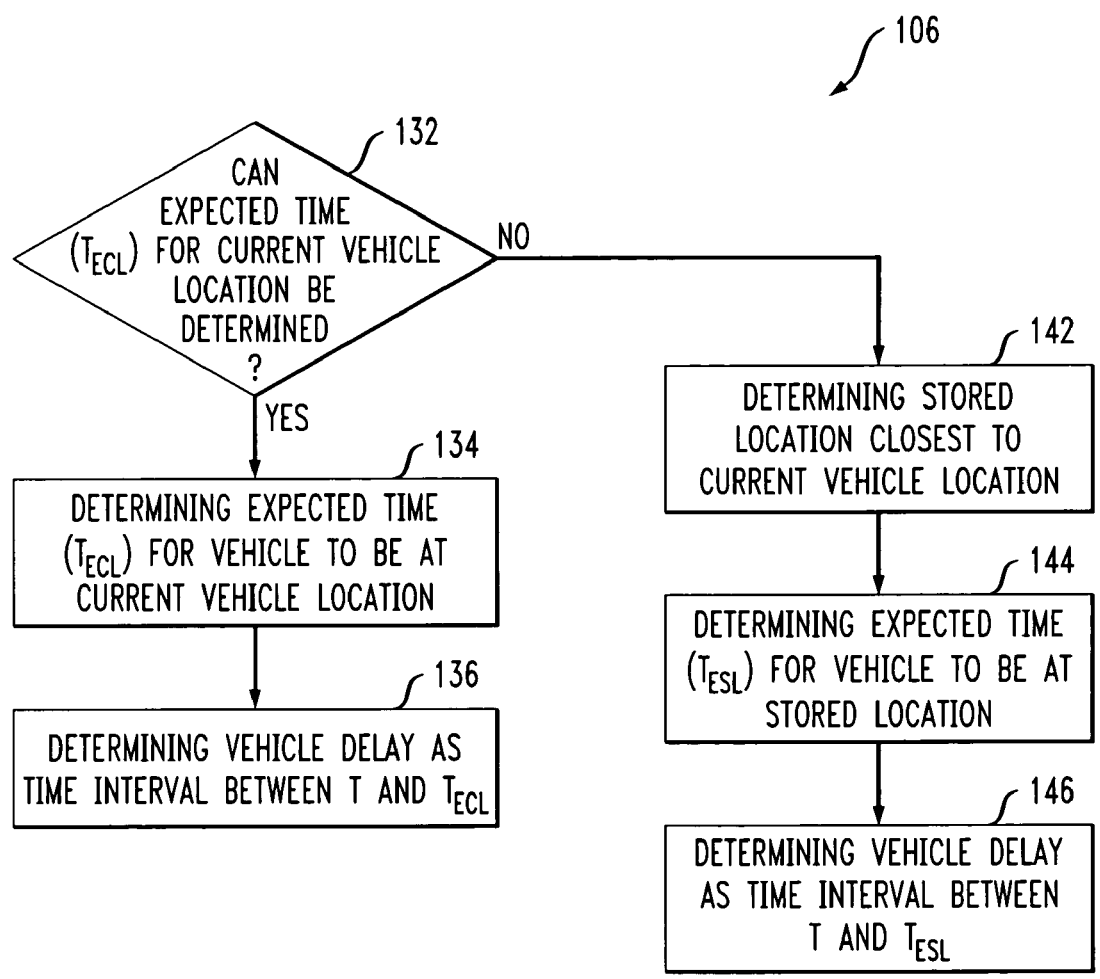
FIG. 3 is a flow chart illustrating a method of determining the vehicle delay.

Referring now to FIGS. 2 and 3, the method of operation of the system of notifying one or more mobile telecommunications subscribers of a vehicle delay shall be described. The method can include a network element, such as for example the Application Server 22, receiving notification conditions from one or more of the telecommunications subscribers. Alternatively, some or all of the notification conditions can be derived by the Application Server 22, for example, the vehicle delay threshold described below may be set at a fixed time period rather than being supplied by the subscriber 13. For simplicity, the operation shall be described with reference to a single telecommunications subscriber 13 being notified of the delay of a single vehicle 40, 42, though it should be appreciated that any number of people can be notified of the delay or delays of any number of vehicles.

The subscriber 13 can provide the notification conditions to the Application Server 22 in a variety of manners including but not limited to providing voice commands to a live or automated operator, via the mobile telecommunications phone 12, via a network connection such as an Internet connection, among others. The notification conditions can be stored in the subscriber database 24 and can be accessed by the Application Server 22 as described below. The notification conditions can include vehicle identification information identifying the vehicle which is to be monitored for the vehicle delay. The vehicle can be identified in any suitable manner. Examples of the vehicles which can be monitored by the invention can include public transportation vehicles, including but not limited to busses, trains, and subway trains, one of which is shown at 40, among others. The vehicle can also be a school bus shown at 42.

The notification conditions provided by the subscriber 13 can also include the vehicle destination that the subscriber is interested in. Examples of the vehicle destination can include, but are not limited to, particular bus stops at given locations, subway stops, train arrival and/or departure locations, school bus drop-off or pick-up points, etc. It is contemplated that any location at which the vehicle is scheduled to stop at can be a vehicle destination.

The notification conditions provided by the subscriber 13 can also include a vehicle delay threshold, given as a period of time, such as for example, in minutes. The delay threshold is a threshold used to trigger the notification of the subscriber that the vehicle is delayed. If the vehicle delay meets and/or exceeds the delay threshold, the affected subscribers are notified as described below. As an example, which should not be considered limiting, the subscriber can set the delay threshold at 15 minutes.

The method of operation of the system 10 can include determining the current vehicle location at 104 at time T. The vehicle can be monitored, either continuously or at particular times, to determine the vehicle location at 104. The vehicle location can be determined and communicated to the Application Server 22. Examples of determining the vehicle location at 104 can include using a device in or onboard the vehicle which uses the Global Positioning System (GPS) to determine the vehicle's location and transmitting the location information, such as GPS coordinates, to the Application Server in a known manner. This can be accomplished using mobile telecommunications base stations 18. In another example, the vehicle location information can be determined by the mobile telecommunications network 11 using a mobile phone, or other telecommunications compatible hardware, having geolocation capabilities. The geolocation capable phone transmits its location to the Application Server 22 via the Base Station 18 in a known manner.

In another example, the transportation provider can determine the location of the vehicle. This location information can be collected by the transportation provider's transportation server 26 and transmitted to the Application Server 22 via the network connection 28 or in other suitable manners. The transportation provider can determine the vehicle location in the manners described above, or using extravehicle sensors, or in other suitable manners. For example, Transportation provider operating a subway train 40 can use sensors located along the subway tracks to determine the location of the subway train.

The method of operation of the system 10 can also include determining the vehicle delay at 106. The vehicle delay is a length of time, such as for example a period of minutes, that the vehicle is currently delayed from its expected or scheduled time. Examples are provided of determining the vehicle delay in two different ways, though it is contemplated that the vehicle delay at 106 can be determined in other manners. At 132, it is determined if the expected time ($T_{ECL}$) for the current vehicle location can be determined. The expected time $T_{ECL}$ for the current vehicle location is the time that the vehicle is expected and/or scheduled to be at the current vehicle location determined in step 104. If the expected time $T_{ECL}$ can be determined, it is determined at step 134. In one example, which should not be limiting, the expected time $T_{ECL}$ for the current vehicle location can be determined using a look up table having stored expected times $T_{ECL}$ associated with vehicle locations, one of which is the current vehicle location determined in step 104. The look up table can be stored in the transportation schedule database 30 and communicated to the Application Server 22, or it can be stored at the Application Server. The vehicle delay is determined to be the time interval between the time T that the current vehicle location is determined at step 104 and the expected time the vehicle is expected to be at the current vehicle location $T_{ECL}$.

If it is determined that the expected time for the current vehicle location cannot be determined at step 132, the stored location which is closest to the current vehicle location is determined. In one example, the transportation schedule database 30 can store a plurality of locations and the times the vehicle is expected to be at those locations. These locations can include scheduled stops as well as any number of locations between those scheduled stops. With a large number of stored locations, the closest location can be used to achieve an accurate estimated vehicle delay.

The stored location closest to the current vehicle location determined in step 104 is then determined at 142 and communicated to the Application Server 22. The Application Server 22 determines the expected time ($T_{ESL}$) for the vehicle to be at the stored closest location at step 144. The Application Server 22 then determines the vehicle delay at 146 as the time interval between T and $T_{ESL}$.

Referring again to FIG. 2, the Application Server 22 then determines if the vehicle delay determined in step 136 or 146 meets or exceeds the delay threshold at 108. For example, if the vehicle delay is determined to be 11 minutes in step 136 or 146, and the vehicle delay threshold is 15 minutes, the vehicle delay does not meet or exceed the delay threshold, as shown at 110, and steps 104 and 106 are repeated. If it is determined that the vehicle delay does meet or exceed the vehicle delay threshold as shown at 112, the subscribers affected by the delay, referred to as the affected subscribers are notified of the delay as described below.

The expected arrival time for a destination can optionally be determined at 114. The expected arrival time can be determined by adding the vehicle delay to the scheduled arrival time for the destination stored in the transportation schedule database 30, or it can be determined in other manners. The reason for the vehicle delay can optionally be determined at 116. The reason for the vehicle delay can be communicated to the Application Server 22 by the operator of the vehicle, by the transportation provider, or in any other suitable manner.

The subscribers 13 affected by the vehicle delay can be determined at 118. The Application Server 22 accesses the subscriber database 24 to determine the affected subscribers 13. The affected subscribers are those subscribers who are associated with the vehicle, such as for example those subscribers who have identified the vehicle via the notification conditions they provided, or who are associated with the vehicle in other ways. The affected subscribers are also those subscribers associated with a delay threshold which was met or exceeded in step 108, such as for example those subscribers who provided such a delay threshold via notification conditions.

A telecommunications network element, such as the MSC 20 and/or Application Server 22 then sends a message to one or more mobile telecommunications phones 12 associated with the one or more affected mobile telecommunications subscribers 13 notifying them that the vehicle is delayed at 120. The association between the affected mobile subscribers 13 and their mobile phones can be determined from the subscriber database 24. The message can be an SMS message which is broadcast to the one or more affected subscribers via the SMSC 23, or other types of messages which can be sent via the MSC 20 and/or Application Server 22 to the mobile phones 13. In addition to providing a notification of the vehicle delay, the message can also include the length of the vehicle delay, such as for example 22 minutes, and the time that the delay was determined. The message can also include the expected time of arrival, as determined in step 114, for the destination that the subscribers provided as part of the notification conditions described above. The message can also include the reason for the delay.

The vehicle 40, 42 can be continued to be monitored as shown by the arrow 122 and the affected subscriber(s) 13 can be updated about the vehicle delay. For example, the affected subscriber(s) 13 can be updated on a periodic basis with a message stating that the vehicle is still delayed at 120. The subscribers can provide this update period in the notification conditions described above. The affected subscriber(s) 13 can also optionally be notified that the vehicle 40, 42 is no longer delayed as shown at 124 via a message similar to that sent in step 120.

The invention described herein enables mobile subscribers to be notified that a vehicle they are interested in is delayed. They can be informed of the delay, as well as other pertinent information, regardless of their location enabling them to plan accordingly.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

We claim:

1. A method of vehicle delay notification comprising:
   determining a location of a vehicle;
   determining a vehicle delay equal to a length of time the vehicle is delayed including:
      determining current vehicle location at a sampling time T,
      determining expected time $T_{ECL}$ the vehicle is expected to be at the current vehicle location, and
      determining the vehicle delay as the time interval between T and $T_{ECL}$;
   a mobile telecommunications network element determining that the vehicle delay meets or exceeds a delay threshold;
   a mobile telecommunications network element determining one or more affected mobile telecommunications subscribers; and
   a telecommunications network element sending a message to one or more mobile telecommunications phones located remotely from the vehicle notifying the one or more affected mobile telecommunications subscribers that the vehicle is delayed.

2. The method defined in claim 1 further comprising:
   determining an expected arrival time for a scheduled destination;
   sending a message to one or more mobile telecommunications phones notifying the one or more affected mobile telecommunications subscribers of the expected arrival time.

3. The method defined in claim 1 further comprising receiving the delay threshold from a mobile telecommunications subscriber.

4. The method defined in claim 1 wherein the sending step further comprises sending an SMS message.

5. The method defined in claim 1 wherein the sending step further comprises sending a message providing the reason for the vehicle delay.

6. The method defined in claim 1 wherein the step of determining the vehicle location further comprises using Global Positioning System information.

7. The method defined in claim 1 wherein the step of determining the vehicle location further comprises:
   having a geolocation equipped mobile phone with the vehicle; and
   the network determining the location of the geolocation equipped mobile phone.

8. The method defined in claim 1 further comprising a transportation provider providing the vehicle location.

9. The method defined in claim 1 further comprising:
   determining the locations of a plurality of vehicles;
   determining vehicle delays equal to the lengths of time the plurality vehicles are delayed;
   determining a plurality of affected mobile telecommunications subscribers affected by the vehicle delays; and a telecommunications network element sending a message to the plurality of mobile telecommunications phones notifying the plurality of affected mobile telecommunications subscribers that the vehicles are delayed.

10. The method defined in claim 1 further comprising continuing to monitor the vehicle and updating the affected subscribers about the vehicle delay.

11. The method defined in claim 1 wherein the step of determining the vehicle delay further comprises:
receiving scheduled stops and scheduled arrival and departure times for the vehicle from a transportation server having a transportation schedule database operated by a transportation provider.

12. The method defined in claim 1 wherein the vehicle is a public transportation vehicle having scheduled stops.

13. A method of vehicle delay notification comprising:
determining a location of a vehicle;
determining a vehicle delay equal to a length of time the vehicle is delayed including:
   determining current vehicle location at a sampling time T,
   determining stored location closest to the current vehicle location from a plurality of stored locations,
   determining expected time $T_{ESL}$ the vehicle is expected to be at the stored location, and
   determining the vehicle delay as the time interval between T and $T_{ESL}$;
a mobile telecommunications network element determining that the vehicle delay meets or exceeds a delay threshold;
a mobile telecommunications network element determining one or more affected mobile telecommunications subscribers; and
a telecommunications network element sending a message to one or more mobile telecommunications phones located remotely from the vehicle notifying the one or more affected mobile telecommunications subscribers that the vehicle is delayed.

14. The method defined in claim 13 further comprising:
determining an expected arrival time for a scheduled destination;
sending a message to one or more mobile telecommunications phones notifying the one or more affected mobile telecommunications subscribers of the expected arrival time.

15. The method defined in claim 13 further comprising receiving the delay threshold from a mobile telecommunications subscriber.

16. The method defined in claim 13 wherein the sending step further comprises sending an SMS message.

17. The method defined in claim 13 wherein the sending step further comprises sending a message providing the reason for the vehicle delay.

18. The method defined in claim 13 wherein the step of determining the vehicle location further comprises using Global Positioning System information.

19. The method defined in claim 13 wherein the step of determining the vehicle location further comprises:
having a geolocation equipped mobile phone with the vehicle; and
the network determining the location of the geolocation equipped mobile phone.

20. The method defined in claim 13 further comprising a transportation provider providing the vehicle location.

21. The method defined in claim 13 further comprising:
determining the locations of a plurality of vehicles;
determining vehicle delays equal to the lengths of time the plurality vehicles are delayed;
determining a plurality of affected mobile telecommunications subscribers affected by the vehicle delays; and
a telecommunications network element sending a message to the plurality of mobile telecommunications phones notifying the plurality of affected mobile telecommunications subscribers that the vehicles are delayed.

22. The method defined in claim 13 further comprising continuing to monitor the vehicle and updating the affected subscribers about the vehicle delay.

23. The method defined in claim 13 wherein the step of determining the vehicle delay further comprises:
receiving scheduled stops and scheduled arrival and departure times for the vehicle from a transportation server having a transportation schedule database operated by a transportation provider.

24. The method defined in claim 13 wherein the vehicle is a public transportation vehicle having scheduled stops.

25. A system for notifying one or more mobile telecommunications subscribers of a vehicle delay comprising:
means for determining a vehicle location;
means for determining a vehicle delay equal to the length of time the vehicle is delayed including:
   means for determining current vehicle location at a sampling time T,
   means for determining expected time $T_{ECL}$ the vehicle is expected to be at the current vehicle location, and
   means for determining the vehicle delay as the time interval between T and $T_{ECL}$;
means for determining that the vehicle delay meets or exceeds a delay threshold;
means for determining one or more affected mobile subscribers; and
means for sending a message to one or more mobile telecommunications phones notifying the one or more affected subscribers that the vehicle is delayed.

26. The system defined in claim 25 further comprising means for receiving the delay threshold from a mobile telecommunications subscriber.

* * * * *